United States Patent Office 3,652,676
Patented Mar. 28, 1972

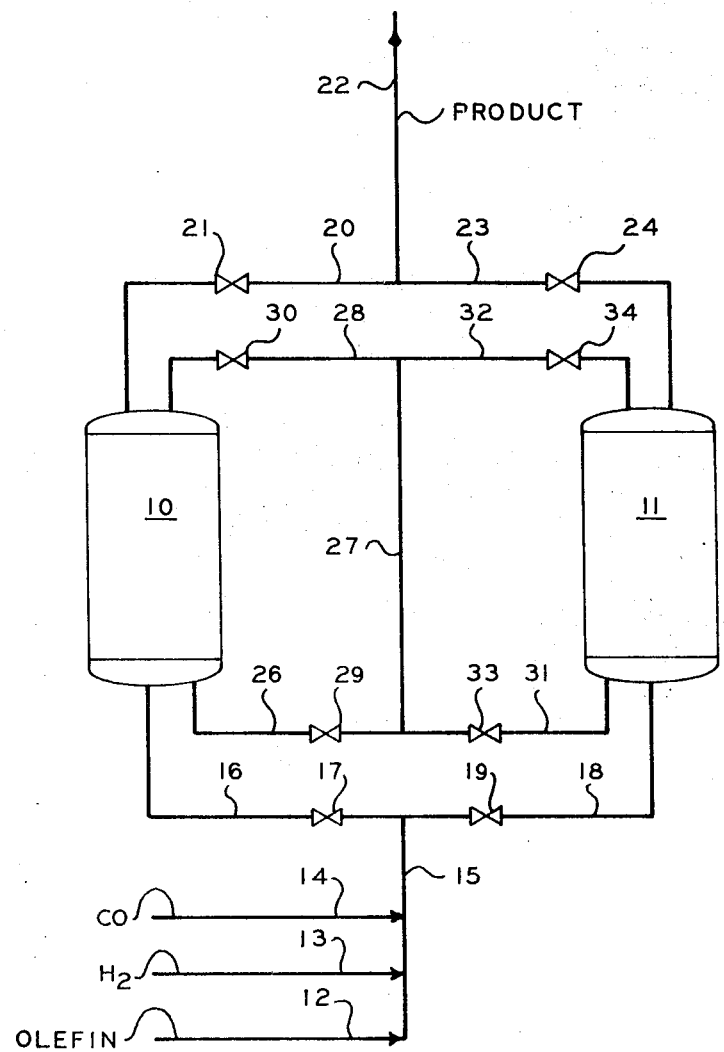

3,652,676
HYDROFORMYLATION PROCESS AND CATALYST
Gerald R. Kahle and James W. Cleary, Bartlesville, Okla., assignors to Phillips Petroleum Company
Filed July 11, 1969, Ser. No. 840,952
Int. Cl. C07c 45/02
U.S. Cl. 260—604 HF                    11 Claims

ABSTRACT OF THE DISCLOSURE

Hydroformylation reactions are carried out in the presence of a catalyst comprising a solid polymer having associated therewith a metal of the group cobalt, rhodium, ruthenium, platinuum and palladium. The polymer is formed by polymerizing a pyridine and a styrene in the presence of a polyvinylaromatic compound. This polymer can be used to remove catalyst residues from hydroformylation reaction effluent streams.

---

It is well known that various olefins can be reacted with carbon monoxide and hydrogen so as to be converted into corresponding aldehydes and/or alcohols. These reactions are often referred to as oxo or hydroformylation reactions. In the past, dicobalt octacarbonyl has commonly been used as a catalyst for carrying out reactions of this type. A typical known reaction is one in which the catalyst comprises dissolved cobalt in a concentration of approximately 2,000 parts per million in the reaction zone. Unfortunately, substantial amounts of the catalyst are dissolved in the reaction products and must eventually be recovered. The recovery of catalyst from the reaction products is a relatively expensive operation and greatly increases the cost of the process. It is also known that reactions of this type can be carried out by use of catalyst systems which comprise a complex of a metal, such as cobalt, carbon monoxide and a nitrogen-containing ligand comprising a substituted pyridine, see U.S. Pat. 3,231,631, for example. Again, catalyst removal is a problem.

In accordance with a recently filed application, it has been found that an improved catalyst for use in oxo reactions can be prepared by combining conventional oxo catalysts, such as dicobalt octacarbonyl, with a solid support formed of a nitrogen-containing polymer. By use of a catalyst system of this type, it is possible to maintain the concentration of metal in the reaction zone at a low level which greatly simplifies the removal of catalyst residues from the reaction products. In addition, catalyst residues from the reaction products in an oxo process can be recovered by passing the reactor effluent through a bed of the nitrogen-containing polymer. The polymer serves to remove catalyst residues from reaction products, and in so doing forms a material which can subsequently be used as the catalyst system in an oxo process.

In accordance with the present invention it has been found that an improved catalyst system of this general type can be produced by use of a polymer prepared by polymerizing a pyridine and a styrene in the presence of a polyvinyl aromatic compound. The catalyst system prepared by the use of such a polymer has less tendency to swell than a system prepared by use of a polymer not containing styrene. The styrene containing polymer tends to resist decomposition of the catalyst system under reaction conditions.

The accompanying drawing is a schematic representation of apparatus which can be employed to carry out the process of this invention.

The novel catalyst system of this invention is formed by contacting a solid polymer with a metal which serves to promote the reaction of olefinic materials with carbon monoxide and hydrogen. The metals which can be so employed are cobalt, rhodium, ruthenium, platinum and/or palladium, which are in such a form as to constitute a metal carbonyl under the reaction conditions. In general, cobalt is the preferred metal, and advantageously can be in the form of cobalt hydrocarbonyl or dicobalt octacarbonyl.

The polymers employed in the catalyst system of this invention are prepared by polymerizing (1) a vinyl substituted monocyclic pyridine, (2) a styrene and (3) a polyvinyl aromatic compound. The pyridine is of the formula:

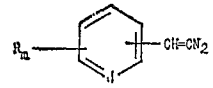

wherein each R is an alkyl group having 1 to 4 carbon atoms, and $m$ is 0, 1 or 2. Examples of such pyridines include 2-vinylpyridine, 3-vinylpyridine, 4-vinylpyridine, 2-methyl-5-vinylpyridine, 4-butyl-2-vinylpyridine, 3,5-dimethyl 2-vinylpyridine, 3-ethyl-5-propyl-4-vinylpyridine and the like. One or more of these pyridines can be employed.

The styrene is of the formula:

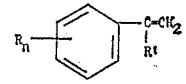

wherein R' is hydrogen or R (as defined above), and $n$ is 0, 1, 2 or 3. Examples of such styrenes include styrene, α-methylstyrene, α-butylstyrene, 4-ethylstyrene, 3-propylstyrene, 3,4,5-trimethylstyrene, and 3-methyl-4-butylstyrene. One or more of these styrenes can be employed.

The polyvinyl aromatic compounds employed can have any of the following general formulas:

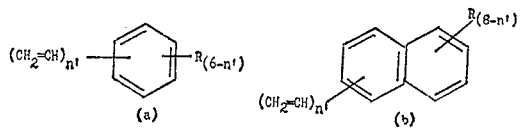

(a)     (b)

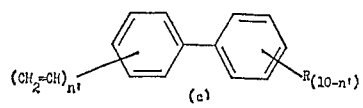

(c)

wherein R is the same as above, with the total of the alkyl substituents containing not more than 12 carbon atoms, and $n'$ is 2 or 3. The substituents in the above Formulas b and c can be on either or both rings. Examples of suitable polyvinyl aromatic compounds which can be employed include divinylbenzene,
1,2,4-trivinylbenzene,
1,3-divinylnaphthalene,
1,8-divinylnapthalene,
1,3,5-trivinylnaphthalene,
2,4-divinylbiphenyl,
3,5,4'-trivinylbiphenyl,
1,2-divinyl-3,4-dimethylbenzene,
1,5,6-trivinyl-3,7-diethylnaphthalene,
1,3-divinyl-4,5,8-tributylnaphthalene,
2,2'-divinyl-4-ethyl-4'-propylbiphenyl, and the like. The divinyl aromatic hydrocarbons containing up to 26 carbon atoms are preferred, particularly divinylbenzene in either its ortho, meta, or para isomer. Commercial divinylbenzene which is a mixture of isomers is quite satisfactory. One or more of the polyvinyl aromatic compounds can be employed.

In preparing the polymer for use in the catalyst system of this invention, the vinylpyridine, styrene and polyvinyl aromatic compound are introduced into a suitable reactor along with a polymerization catalyst. The amount of styrene employed is in the range of about 18 to about 300 parts by weight per 100 parts of pyridine. The amount of polyvinyl aromatic compound employed is in the range of about 1 to 15 parts by weight per 100 parts total pyridine plus styrene. Although we do not wish to be limited to any particular theory of reaction, it is believed that the polyvinyl aromatic compound acts as a cross-linking agent. Various catalysts known in the art for the polymerization of vinylpyridines can be employed. Suitable catalysts for this purpose include peroxy compounds, perchlorates, persulfates, diazothioether compounds, azo-bis-alkylnitrile compounds, and the like. Examples of specific catalysts which can be used include hydrogen peroxide, di-tert-butyl peroxide, benzoyl peroxide, perchloric acid, persulfuric acid, cumene hydroperoxide, (dimethylbenzene-diazo-mercapto)naphthalene, azo-bis-isobutyronitrile (AIBN), and the like. Other catalysts which can be employed include free radical precursors which are listed in the Faraday Society Symposium on Free Radicals, London, 1953 and the book Free Radicals by Ingram, Academic Press, Inc., New York, 1958. The amount of catalyst used is generally in the range of 0.01 to 2 parts by weight per 100 parts of total pyridine and styrene.

The polymerization reactions are advantageously carried out in the presence of a reaction medium which comprises a mixture of methanol and water. This mixture should contain from 35 to 65 volume percent methanol. When this specific reaction medium is utilized, the resulting polymer is in the form of a fluffy white solid. This solid can be water-washed to recover a white, free-flowing powder comprising small beads of polymer. These polymer beads are particularly useful as a support for forming the catalysts.

The polymerization reaction can take place under a variety of reaction conditions. For example, reaction temperatures in the general range of 25 to 150° C. are suitable. Reaction pressure of 0 to 100 p.s.i.g., or higher, can be employed. Reaction times are usually in the range of 15 minutes to 150 hours. It is generally desirable to carry out the polymerization reaction in an inert atmosphere. This can be accomplished by purging the reactor with an inert gas such as nitrogen, and maintaining a blanket of such a gas within the reactor during the polymerization. The reaction effluent can be water washed to remove traces of catalyst and recover polymer in powder form.

The catalyst system of this invention can be formed by any convenient procedure. For example, cobalt naphthenate, dicobalt octacarbonyl or other hydrocarbon-soluble compound or compounds of cobalt, rhodium, ruthenium, platinum and/or palladium can be dissolved in an aromatic, paraffinic, or cycloparaffinic material or in the olefinic material itself which is to be employed in the oxo reaction. The resulting solution is then placed in contact with the polymer under an atmosphere of carbon monoxide and hydrogen at a temperature in the general range of 250 to 400° F. The mixture can be agitated until equilibrium has been attained between the metal on the polymer and metal in solution. This usually requires from about 10 seconds to about one hour. However, as discussed in greater detail hereinafter, the catalyst system can actually be formed in the oxo reaction chamber itself. The amount of metal on the polymer support is of the order of 0.2 to 20, preferably 0.5 to 10, millimoles of metal per 5 grams of polymer support.

The oxo reaction is carried out by contacting an olefinic material with carbon monoxide and hydrogen in the presence of the catalyst system of this invention. The reaction is generally carried out at pressures in the range of 600 to 5000 p.s.i.g. of hydrogen and carbon monoxide, with about 1500 to 2500 p.s.i.g. being preferred. The reaction temperature depends to a large degree on the pressure employed as well as the desired reaction product. Temperatures in the range of about 200 to 450° F., preferably 330 to 370° F., are preferred. In general, lower pressures favor production of more branched product and high boilers. Alcohol production increases at higher pressures. The residence time is of the order of 1 minute to 10 hours, preferably 10 minutes 5 hours.

The process of this invention is applicable to the reaction of any aliphatic, either cyclic or acyclic, compound having at least one ethylenic carbon-to-carbon linkage. The invention is particularly applicable to olefinic hydrocarbons containing from 2 to about 12 carbon atoms. Both conjugated and non-conjugated olefins can be employed. Cyclic compounds, particularly 5 and 6 ring carbon atom hydrocarbons, can be reacted. The process of this invention is also applicable to the reaction of nonhydrocarbons containing ethylenic carbon-to-carbon linkages. In general, the catalyst system of this invention can be employed to advantage in carrying out the various hydroformylation reactions enumerated in U. S. Pat. 3,231,621.

In carrying out the process of this invention, at least 1 mol of carbon monoxide and 2 mols of hydrogen are required for each mol of olefinic material when alcohols are to be produced. In the production of aldehydes, only one mol of hydrogen is required for each mol of olefin. The ratio of hydrogen to carbon monoxide can thus be varied according to the desired reaction products. In general, the mol ratio will be at least 1. In many cases, the rate of reaction as well as the yield of desired product can be increased by increasing the hydrogen to carbon monoxide mol ratio above 1.

The catalyst system of this invention is quite effective in carrying out oxo reactions with commercially available feed streams containing sulfur compounds, which are considered to be catalyst poisons in conventional oxo reactions. It appears that the polymer portion of the catalyst system may act as a reservoir for the soluble metal, and release additional metal to replace that which may be tied up by the catalyst poisons.

As previously mentioned, the solid polymer employed in preparing the catalyst system of this invention can also be used to advantage to remove catalyst residues from the reaction products. At temperatures below about 300° F., approximately 90 to 95% of soluble cobalt carbonyl is deposited on the copolymer base. A system for carrying out the process of this invention, including catalyst residue removal, is illustrated schematically in the accompanying drawing. The apparatus therein illustrated comprises two chambers 10 and 11 which can be any suitable vessels of configurations capable of retaining the solid polymer of the catalyst system of this invention. For example, these chambers can be provided with screens at the two ends to retain the catalyst. It will be assumed that reactor 10 initially contains the complete catalyst system, whereas reactor 11 initially contains only the solid polymer component of the catalyst system. Olefinic feed, hydrogen and carbon monoxide are introduced through respective conduits 12, 13 and 14 which communicate with a common inlet conduit 15. Conduits 12, 13 and 14 can be provided with flow control means, not shown, to regulate the rates of introduction of the feed materials. A conduit 16, having a valve 17 therein, communicates between conduit 15 and a first inlet of reactor 10. A corresponding conduit 18, having a valve 19 therein, communicates between conduit 15 and reactor 11. A conduit 20, having a valve 21 therein, communicates between an outlet of reactor 10 and a common outlet conduit 22. A similar conduit 23, having a valve 24 therein, communicates between reactor 11 and conduit 22. A second inlet of reactor 10 is connected to a second outlet thereof by conduits 26, 27 and 28. Valves 29 and 30 are disposed in respective conduits 26 and 28. Similarly, a second inlet of reactor 11 is connected to a second outlet thereof by conduits 31, 27 and 32. Valves 33 and 34 are disposed in respective conduits 31 and 32.

At the beginning of the reaction cycle, valves 17, 30, 33 and 24 are open and valves 19, 34, 29 and 21 are closed. Thus, the feed materials flow from conduit 15 through conduit 16, reactor 10, conduits 28, 27 and 31, reactor 11, and conduit 23 to outlet conduit 22. The oxo reaction takes place in reactor 10, and the effluent stream passes through reactor 11. The polymer contained within chamber 11 serves to remove catalyst residues from the reaction products. Any cobalt, or other metal catalyst, which may be entrained in the reactor effluent, is deposited on the solid polymer in reactor 11 and is thereby removed from the effluent stream. This operation continues until the polymer in reactor 11 is no longer capable of removing the desired quantity of catalyst residue and/or until the catalyst in reactor 10 has lost its desired activity because of the removal of metal with the reactor effluent stream. At this time, the system can be reversed so that chamber 11 serves as the reaction chamber and chamber 10 serves as the catalyst scavenging bed. This is accomplished by opening valves 19, 34, 29 and 21 and closing valves 17, 30, 33 and 24. In this procedure, the catalyst system is effectively formed in-situ in the vessel which serves to remove catalyst residues from the reaction products. The desired product or products can be separated from other materials in the reactor effluent by fractionation or any other convenient procedure.

In the procedure illustrated in the drawing the vessel serving as the reactor is maintained in the temperature range of 300 to 450° F., with the pressure being in the range of 600 to 5000 p.s.i.g. The scavenging bed vessel is maintained in the temperature range of 50 to 250° F., with the pressure being in the range of 600 to 5000 p.s.i.g. Suitable heat exchangers and compressors, not shown, can be associated with the illustrated apparatus to maintain these conditions.

The catalyst residue removal system can also be used to treat effluent streams from conventional hydroformylation reactions employing any of the metals listed above as catalysts.

The following examples demonstrate various features of this invention:

EXAMPLE I

A number of runs were conducted to demonstrate the use of several different polymers in catalyst systems to carry out oxo reactions. In these runs, 75 milliliters of hexene-2, 5 grams of polymer and 0.5 gram of $Co_2(CO)_8$ were charged to a stirred autoclave. The polymers were prepared by polymerizing mixtures of the vinylpyridines and divinylbenzene in the noted weight ratios. The resulting solid polymer, in the form of finely divided particles, was employed. After charging, the autoclave was purged three times with an equimolar mixture of hydrogen and carbon monoxide at pressures in the range of 300 to 400 p.s.i. The autoclave was then pressured to 2200 p.s.i. with this gas blend, and thereafter heated to the temperatures noted for the times noted. Two runs were carried out with each catalyst system, and are designated as Runs 1 and 2 in the following Table I. The first run was carried out in the manner described. At the completion of the first run, the liquid product was decanted and a second run was carried out by charging an additional 75 milliliters of hexene-2, but without additional $Co_2(CO)_8$. The following results were obtained:

TABLE I

| Pyridine monomer | Monomer/ divinyl-benzene wt. ratio | Run | Temp., °F. | Time, min. | 2-hexene conv., percent | Mole percent selectivity of 2-hexene to— | | | | | | Wt. percent high boiler | Branched/ normal product ratio | Cobalt (p.p.m.) in liquid product |
|---|---|---|---|---|---|---|---|---|---|---|---|---|---|---|
| | | | | | | n-Hexane | Branched $C_7$ aldehydes | n-$C_7$ aldehyde | $C_7$ formates | Branched $C_7$ alcohols | n-$C_7$ alcohol | | | |
| 2-vinyl | 98/2 | 1 | 320-50 | 120 | 77 | 2.5 | 38 | 45 | 0.4 | 2.5 | 3 | 9 | 45/55 | 82 |
| | | 2 | 320-50 | 52 | 66 | 2 | 42 | 48 | Trace | 1 | 2 | 5 | 47/53 | 30 |
| | 96/4 | 1 | 300-35 | 75 | 75 | 2.5 | 41 | 51 | 0.4 | 1 | 2 | 2.5 | 44/56 | 40 |
| | | 2 | 300-40 | 80 | 66 | | 39 | 44 | 0.2 | 3 | 4 | 5.5 | 46/54 | 50 |
| | 92/8 | 1 | 300-20 | 202 | 77 | | 36 | 36 | 0.4 | 4 | 4 | 12.5 | 50/50 | 400 |
| | | 2 | 300-20 | 93 | 59 | 1 | 38 | 50 | 1.5 | 1.5 | 2 | | 43/57 | 91 |
| 3-vinyl | 96/4 | 1 | 300-20 | 50 | 97 | 1.5 | 37 | 51 | 0.5 | | | 9 | 42/58 | 930 |
| | | 2 | 210-20 | 165 | 64 | 7.5 | 38 | 46 | 0.7 | 1 | 7.5 | 10 | 45/55 | 20 |
| 4-vinyl | 96/4 | 1 | 250-20 | 25 | 85 | 7.5 | 34 | 32 | Trace | 6.5 | | 13 | 51/49 | 68 |
| | | 2 | 320-55 | 130 | 64 | 3.5 | 39 | 27 | 0.5 | 5 | | 26 | 58/42 | 5 |
| 2-methyl-5-vinyl | 95/5 | 1 | 350-65 330 | 28 | 87 | 10 | 30 | 29 | Trace | 2 | 9 | 14 | 50/50 | 50 |
| | | 2 | 300-30 | 160 | 71 | 2 | 38 | 44 | 0.2 | 2 | 4.5 | 9 | 46/54 | 30 |

It can be seen from the foregoing table that in all of the runs substantial amounts of aldehydes and lesser amounts of alcohols were formed. It can also be seen that the catalyst used in the second runs, without addition of further quantities of $Co_2(CO)_8$, gave substantial conversions. The amount of cobalt in the liquid product was quite low compared to conventional prior art systems, which often have as much as 2,000 p.p.m. cobalt present in the product. These runs clearly demonstrate that the solid polymers of pyridines are effective for use in forming catalysts to carry out oxo reactions.

EXAMPLE II

Several polymers were prepared of the type employed in Example I except that styrenes were added to the monomers being polymerized. The monomers were charged to an autoclave containing 0.20 gram of azo-bis-isobutyronitrile in 500 milliliters of an equal volume mixture of methanol and water. The polymerizations were carried out at 70° C. for 66 hours. The resulting polymers were washed and soaked in water to extract the methanol, and were then dried in a vacuum oven. The following polymers were prepared:

TABLE II

| Run No. | Monomer mixture (grams) | | | | Conversion, percent |
|---|---|---|---|---|---|
| | 2-vinyl-pyridine | Divinyl-benzene | Styrene | Ethyl-styrene | |
| 1 | 84.6 | 6.0 | 9.4 | 4.6 | 93.4 |
| 2 | 75.2 | 6.0 | 18.8 | 4.6 | 92.8 |
| 3 | 65.8 | 6.0 | 28.2 | 4.6 | 92.4 |
| 4 | 56.4 | 6.0 | 37.6 | 4.6 | 92.9 |

The polymer products formed slurries of fine white particles. With increasing amounts of styrene, the slurries became more fluid, showing that the polymers were not so highly swollen by the methanol. The polymer produced in Run No. 2 was tested as an oxo catalyst by contacting the polymer with cobalt carbonyl under an atmopshere of hydrogen and carbon monoxide. It was found that the polymer had less tendency to swell in the presence of hydrocarbon than polymers not containing styrene. In addition, the styrene containing polymer had substantially the same capacity to retain cobalt. Specifically, the polymer of Run No. 2 was found to have 37 percent of its nitrogen available as cobalt complexing sites as compared to 35 percent for a similar polymer containing no added styrene.

EXAMPLE III

The advantage in regard to swelling for the polymers of the present invention was further illustrated by another series of tests. The degree of swelling of several polymers, each containing a different level of styrene incorporation, was observed.

The test was carried out by placing about 3 cc. of each polymer, in the form of about 10–50 mesh particles, into a graduated cylinder. The particles were then covered with an excess quantity of a $C_8$ oxo alcohol. The graduated cylinder was placed in an oven at about 325° F. which is a typical oxo reaction temperature. After 30 minutes the increase in volume of the solid polymer beds was noted with the following results:

| Run No. | Monomer mixture, parts by weight | | | | Swelling, percent |
|---|---|---|---|---|---|
| | 2-vinyl-pyridine | Divinyl-benzene | Styrene | Ethyl-styrene | |
| 1 | 94.0 | 6.0 | 0 | 4.6 | 250 |
| 2 | 84.6 | 6.0 | 9.4 | 4.6 | 250 |
| 3 | 75.2 | 6.0 | 18.8 | 4.6 | 155 |
| 4 | 56.4 | 6.0 | 37.6 | 4.6 | 135 |

These data clearly show that the polymer compositions within the scope of the present invention, namely the polymers of Run 3 and Run 4, exhibit a greatly reduced tendency to swell.

While this invention has been described in conjunction with presently preferred embodiments, it obviously is not limited thereto.

What is claimed is:

1. In a hydroformylation process in which an olefinic material is reacted with carbon monoxide and hydrogen under hydroformylation conditions; the improvement which comprises carrying out the reaction in the presence of a catalyst which comprises a solid nitrogen-containing polymer obtained by polymerizing (1) at least one pyridine of the formula

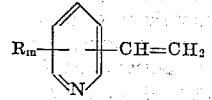

wherein each R is an alkyl group having 1 to 4 carbon atoms and $m$ is 0, 1 or 2, with (2) at least one styrene of the formula

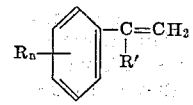

where R′ is hydrogen or R and $n$ is 0, 1, 2 or 3, said polymerization being conducted in the presence of (3) at least one polyvinyl aromatic compound of the formula

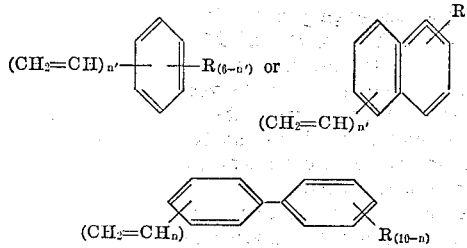

with the total of the alkyl constituents containing not more than 12 carbon atoms, and $n'$ is 2 or 3, the styrene employed in the polymerization comprising about 18 to about 300 parts by weight per 100 parts of pyridine and the polyvinyl aromatic compound being present in the range of about 1 to 15 parts by weight per 100 parts of pyridine plus styrene, said polymer having associated therewith (4) at least one metal carbonyl of a metal of the group consisting of cobalt, rhodium, ruthenium, platinum and palladium, and said metal carbonyl being present in an amount in the range of 0.2 to 20 millimoles of metal per 5 grams of polymer support.

2. The process of claim 1 wherein said metal is cobalt.

3. The process of claim 1 wherein said polyvinyl aromatic compound is divinylbenzene and said styrene is styrene.

4. The process of claim 1 wherein said pyridine is 2-vinylpyridine.

5. The process of claim 1 wherein said reaction is carried out by passing the olefinic material, carbon monoxide and hydrogen through a first zone containing said catalyst, and further comprising the step of passing the effluent from said first zone through a second zone which contains a solid nitrogen-containing polymer obtained by polymerizing (1) at least one pyridine of the formula

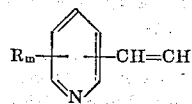

with (2) at least one styrene of the formula

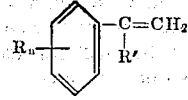

said polymerization being conducted in the presence of at least one polyvinyl aromatic compound of the formula

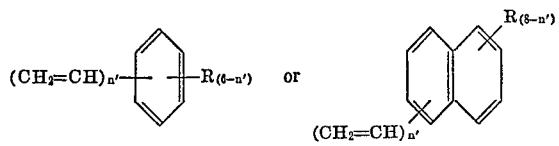

or

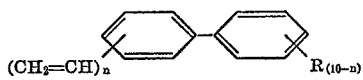

with the total of the alkyl constituents containing not more than 12 carbon atoms, the styrene employed in the polymerization comprising about 18 to about 300 parts by weight per 100 parts of pyridine and the polyvinyl aromatic compound being present in the range of about 1 to 15 parts by weight per 100 parts of pyridine plus styrene.

6. The process of claim 5 wherein the passage of materials through said first and second zones is discontinued after a selected time and thereafter olefinic material, carbon monoxide and hydrogen are passed through said second zone and the effluent therefrom is passed through said first zone.

7. The process of claim 1 wherein the reaction is carried out in the pressure range of 600 to 5,000 p.s.i.g., in the temperature range of 200 to 450° F., and with a mol ratio of hydrogen to carbon monoxide of at least 1.

8. In a hydroformylation process in which an olefinic material is reacted in a first zone with carbon monoxide and hydrogen under hydroformylation conditions in the presence of a catalyst containing at least one metal carbonyl of a metal selected from the group consisting of cobalt, rhodium ruthenium, platinum and palladium, the method of recovering catalyst residues which comprises passing the effluent from said first zone through a second zone which contains a solid nitrogen-containing polymer obtained by polymerizing (1) at least one pyridine of the formula

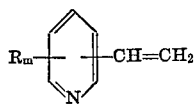

wherein each R is an alkyl group having 1 to 4 carbon atoms and $m$ is 0, 1 or 2, with (2) at least one styrene of the formula

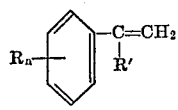

where R' is hydrogen or R and $n$ is 0, 1, 2 or 3, said polymerization being conducted in the presence of (3) at least one polyvinyl aromatic compound of the formula

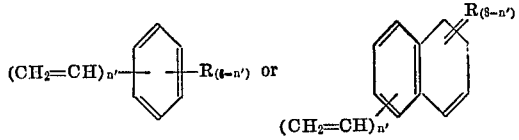

or

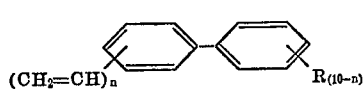

with the total of the alkyl constituents containing not more than 12 carbon atoms and $n'$ is 2 or 3, the styrene employed in the polymerization comprising about 18 to about 300 parts by weight per 100 parts of pyridine and the polyvinyl aromatic compound being present in the range of about 1 to 15 parts by weight per 100 parts of pyridine plus styrene.

9. A catalyst useful in carrying out hydroformylation reactions comprising a solid nitrogen-containing polymer obtained by polymerizing (1) at least one pyridine of the formula

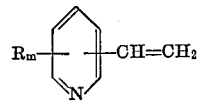

wherein each R is an alkyl group having 1 to 4 carbon atoms and $m$ is 0, 1, or 2, with (2) at least one styrene of the formula

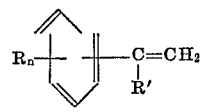

where R' is hydrogen or R and $n$ is 0, 1, 2 or 3, said polymerization being conducted in the presence of (3) at least one polyvinyl aromatic compound of the formula

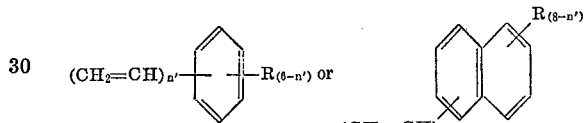

or

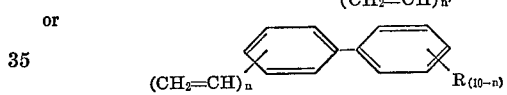

with the total of the alkyl constituents containing not more than 12 carbon atoms, and $n'$ is 2 or 3, the styrene employed in the polymerization comprising about 18 to about 300 parts by weight per 100 parts of pyridine, and the polyvinyl aromatic compound being present in the range of about 1 to 15 parts by weight per 100 parts of pyridine plus styrene, said polymer having associated therewith at least one metal carbonyl of a metal of the group consisting of cobalt, rhodium, ruthenium, platinum and palladium, said metal carbonyl being present in an amount in the range of 0.2 to 20 millimoles of metal per 5 grams of polymer support.

10. The catalyst of claim 9 wherein said polyvinyl compound is divinylbenzene, said styrene is styrene, and said metal is cobalt.

11. The catalyst of claim 10 wherein said pyridine is 2-vinylpyridine.

References Cited

UNITED STATES PATENTS

| | | | |
|---|---|---|---|
| 3,428,514 | 2/1969 | Greer | 161—5 |
| 3,228,882 | 1/1969 | Harle | 252—625 |
| 3,200,007 | 8/1965 | Flowers | 117—138.8 |

DANIEL E. WYMAN, Primary Examiner

P. N. FRENCH, Assistant Examiner

U.S. Cl. X.R.

260—632 HF, 598; 252—430, 431